(12) United States Patent
Wang et al.

(10) Patent No.: US 12,312,002 B1
(45) Date of Patent: May 27, 2025

(54) BI-DIRECTIONAL LOCK MECHANISM FOR STEERING COLUMN

(71) Applicant: Steering Solutions IP Holding Corporation, Saginaw, MI (US)

(72) Inventors: Wei Wang, Jiangsu (CN); Kevin Song, Jiangsu (CN); Dandan Li, Jiangsu (CN); Hongbin Zhang, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/413,865

(22) Filed: Jan. 16, 2024

(30) Foreign Application Priority Data

Dec. 28, 2023 (CN) .......................... 202311833408.2

(51) Int. Cl.
   *B62D 1/19* (2006.01)
   *B62D 1/184* (2006.01)
(52) U.S. Cl.
   CPC ............ *B62D 1/192* (2013.01); *B62D 1/184* (2013.01)
(58) Field of Classification Search
   CPC ......... B62D 1/184; B62D 1/192; B62D 1/185
   See application file for complete search history.

(56) References Cited

U.S. PATENT DOCUMENTS

| | | | | |
|---|---|---|---|---|
| 5,115,691 A | * | 5/1992 | Beauch | B62D 1/192 464/162 |
| 5,161,425 A | * | 11/1992 | Baskett | B62D 1/184 280/775 |
| 5,524,927 A | * | 6/1996 | Toussaint | B62D 1/195 280/775 |
| 5,893,676 A | * | 4/1999 | Yamamoto | B62D 1/184 403/321 |
| 10,703,403 B2 | * | 7/2020 | Reno | F16F 7/128 |
| 2012/0125139 A1 | * | 5/2012 | Tinnin | B62D 1/184 74/493 |
| 2019/0135328 A1 | | 5/2019 | Fricke | |

FOREIGN PATENT DOCUMENTS

DE     102011119154 A1     5/2012

OTHER PUBLICATIONS

Office Action regarding corresponding DE App. No. 10 2024 100 863.6; dated Mar. 21, 2024.

* cited by examiner

*Primary Examiner* — Frank B Vanaman
(74) *Attorney, Agent, or Firm* — Dickinson Wright PLLC

(57) ABSTRACT

A bi-directional locking mechanism for a telescoping steering column includes an energy absorption strap having a first leg, a second leg, and a curved transition portion connecting the first leg and the second leg, wherein the second leg includes a first plurality of teeth. The locking mechanism also includes a teeth bracket having a second plurality of teeth. The locking mechanism further includes a cam, wherein rotation of the cam selectively moves the first plurality of teeth into and out of engagement with the second plurality of teeth to define a locked position and an unlocked position, respectively.

14 Claims, 9 Drawing Sheets

BI-DIRECTIONAL LOCK MECHANISM FOR STEERING COLUMN

CROSS-REFERENCE TO RELATED APPLICATION

This application claims the benefits of priority to Chinese Patent Application No. 202311833408.2, filed Dec. 28, 2023, the disclosure of which is incorporated by reference herein in its entirety.

TECHNICAL FIELD

The following description relates to vehicle steering systems and, more particularly, to a bi-directional lock mechanism for steering columns.

BACKGROUND

A vehicle, such as a car, truck, sport utility vehicle, crossover, mini-van, marine craft, aircraft, all-terrain vehicle, recreational vehicle, or other suitable vehicles, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle. Some steering columns are axially adjustable between positions to provide flexibility in the location of the hand wheel and facilitate more comfortable driving positions for different sizes of drivers or autonomous driving capability. Many axially adjustable steering columns further include rake actuators that permit tilt movement around one or more pivot points.

In addition to providing adjustability, axially adjustable steering column assemblies may also include a collapsible functionality that provides safety advantages during an energy absorption event. A locking mechanism may be required to maintain a moveable portion of the steering column assembly at a desired position after axial adjustment. One type of commonly used locking mechanism in the automotive industry is called a telescoping positive lock mechanism. When designing a telescoping positive lock mechanism, attention is typically paid to allow for proper column locked and unlocked conditions. The unlocked condition must ensure for the allowance of full telescopic/axial range of adjustment. When the steering column assembly is locked, the steering column assembly must maintain a fixed telescopic/axial position while under normal vehicle operating conditions. However, during a collapse event various measures may be implemented to ensure a required collapse condition and/or range of motion while within a range applied load.

Prior telescope eccentric locking mechanisms only provide positive locking in a single direction (which may be referred to as a "telescope in" direction), but only friction retention between the telescoping upper jacket and the lower jacket is relied upon for locking in a "telescope out" direction. Automotive OEMs requirements related to lowering of adjustment lever effort for drivers may challenge the ability of steering system suppliers to continue to rely on the friction-based locking for the telescope out direction.

Accordingly, there is a continuing need to improve the operational framework of locking mechanisms to improve upon packaging, load requirements, and dependability.

SUMMARY

According to one aspect of the disclosure, an axially adjustable steering column includes an upper jacket. The axially adjustable steering column also includes a lower jacket, wherein the upper jacket is axially adjustable relative to the lower jacket. The axially adjustable steering column further includes an adjustment lever. The axially adjustable steering column yet further includes a bi-directional locking mechanism, wherein the adjustment lever selectively moves the bi-directional locking mechanism between a locked position and an unlocked position, wherein the locked position prevents axial adjustment of the upper jacket relative to the lower jacket in both axial directions, and the unlocked position allows adjustment of the upper jacket relative to the lower jacket. The bi-directional locking mechanism includes an energy absorption strap operatively coupled to the upper jacket, the energy absorption strap having a first plurality of teeth formed thereon. The locking mechanism also includes a teeth bracket operatively coupled to the lower jacket, the teeth bracket having a second plurality of teeth formed thereon. The locking mechanism further includes a cam operatively coupled to the adjustment lever, wherein rotation of the adjustment lever causes rotation of the cam, wherein rotation of the cam selectively moves the first plurality of teeth into and out of engagement with the second plurality of teeth to define the locked position and the unlocked position, respectively.

According to another aspect of the disclosure, a bi-directional locking mechanism for a telescoping steering column includes an energy absorption strap having a first leg, a second leg, and a curved transition portion connecting the first leg and the second leg, wherein the second leg includes a first plurality of teeth formed thereon. The locking mechanism also includes a teeth bracket having a second plurality of teeth formed thereon. The locking mechanism further includes a cam, wherein rotation of the cam selectively moves the first plurality of teeth into and out of engagement with the second plurality of teeth to define a locked position and an unlocked position, respectively. The locking mechanism yet further includes a telescope guide operatively coupled to the second leg of the energy absorption strap, wherein the telescope guide includes a main body and a pair of radially inwardly extending legs extending from the main body to laterally retain a portion of the cam. The locking mechanism also includes a telescope stop bracket having a stop segment extending radially inward into a slot defined by the second leg of the energy absorption strap to define telescope travel limits for the telescoping steering column.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
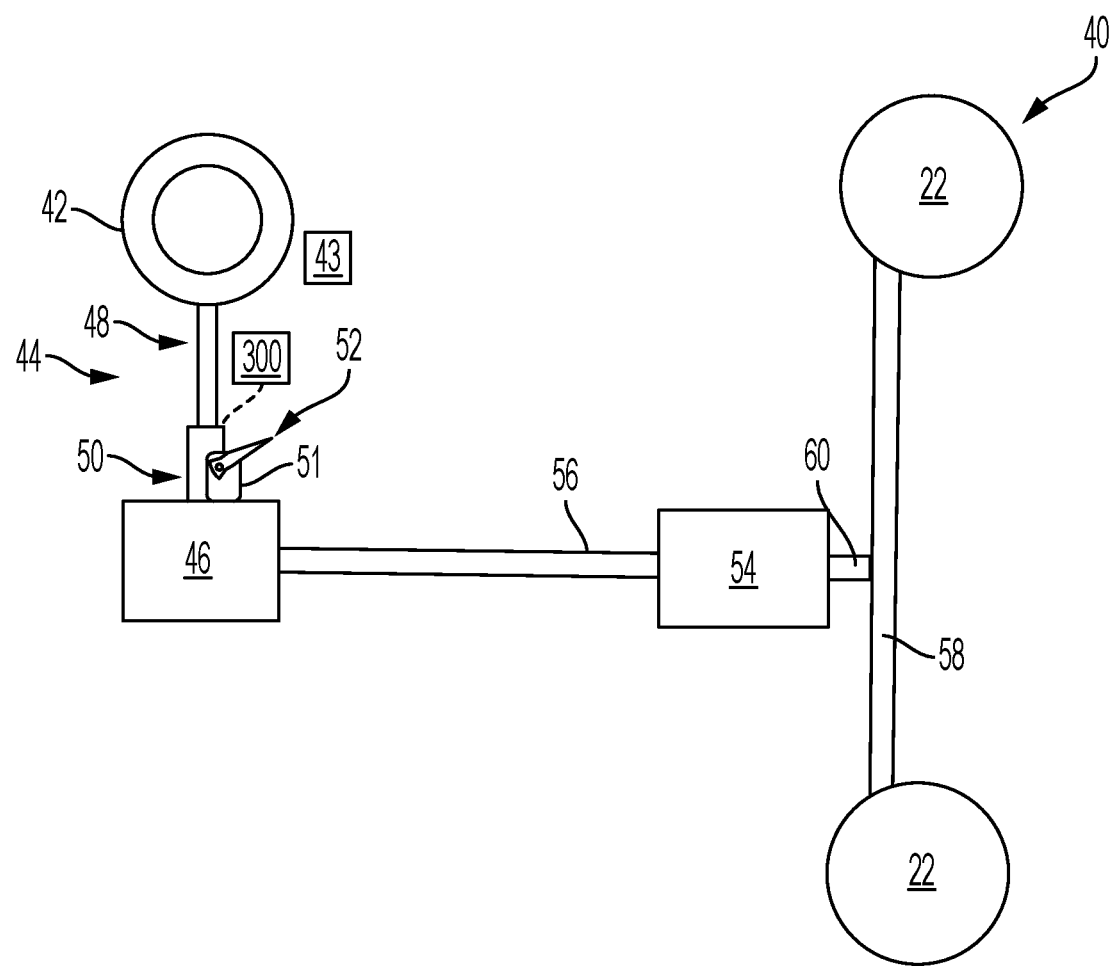
FIG. 1 schematically depicts a steering system including an adjustable steering column assembly.

The following discussion is directed to various embodiments of the disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring now to the drawings, where the various embodiments are shown and described herein, without limiting same, the Figures illustrate embodiments of a steering column assembly that is axially adjustable and includes a lock mechanism with improved dependability and other operational benefits. The axial adjustability can result from relative movement between two or more jackets that permit axial movement therebetween. For example, a first jacket and a second jacket move in a relative telescopic, sliding, or translational configuration.

Referring initially to FIG. 1, a steering system 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles.

The steering system 40 may be configured as a driver interface steering system, an autonomous driving system, or a system that allows for both driver interface and autonomous steering. The steering system may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a bracket 51 that at least partially connects the steering column to the vehicle 10. An adjustable lever 52 may be operably connected to one of the first jacket 48, the second jacket 50, or the bracket 51 to facilitate axial or tilting adjustment of the steering column assembly 44. In some embodiments, behavior of the adjustable lever 52 may be controlled via a control system 300 including a CPU unit. In some embodiments, behavior of the adjustable lever 52 may be controlled manually.

The steering column assembly 44 is moveable over a range of positions from an extended position to a retracted position. While it is contemplated that the second jacket 50 may be axially adjustable, the first jacket 48 is axially adjustable relative to the second jacket 50 to at least partially define the extended and retracted positions of the steering column assembly 44. For example, the first jacket 48 may be referred to as an "upper jacket" and the second jacket 50 may be referred to as a "lower jacket".

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a driving axle 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the drive axle to turn the wheels 22. In other embodiments, the steering column assembly 44 is not directly mechanically connected to the steering gear assembly 54. Such an embodiment may be referred to as a steer-by-wire system.

Figure 2:
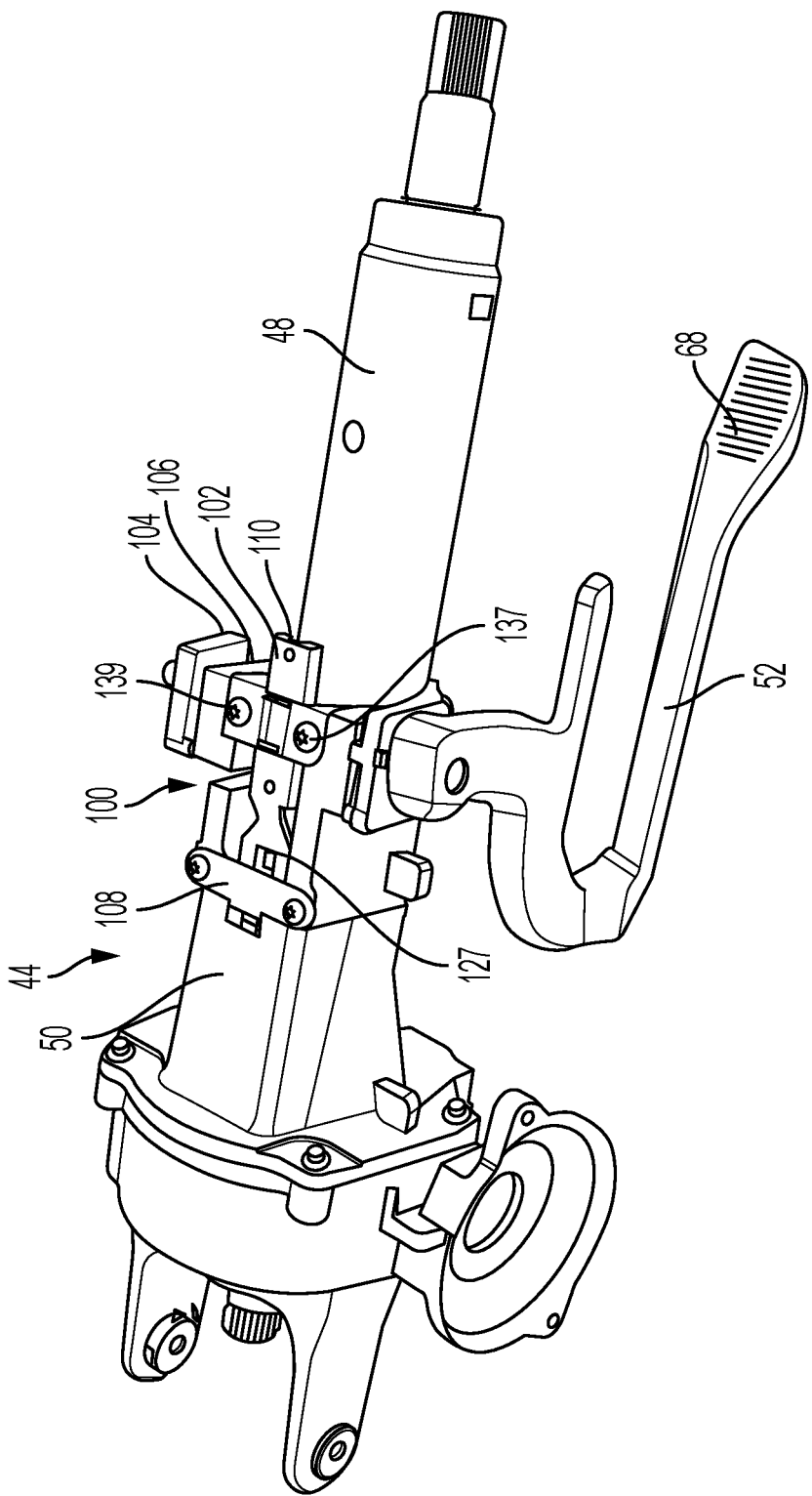
FIG. 2 is a perspective view of a steering column assembly having a bi-directional lock mechanism for an energy absorption strap.

FIG. 2 generally illustrates the adjustable steering column assembly 44 with the lever 52 and a bi-directional lock mechanism 100. The adjustable lever 52 includes a handle 68 and extends from a free end to a connection end which is connected to the steering column assembly 44. The lock mechanism 100 includes a cam assembly (not shown) which biases the upper and lower jacket into an unlocked position upon rotation of the lever 52 to allow telescope adjustment of the upper jacket 48 relative to the lower jacket 50 and selectively locks the upper and lower jacket at a fixed position. The bi-directional lock mechanism 100 increases the bi-directional telescope holding force or maintains a similar holding force while reducing required lever effort for a user.

Figure 3:
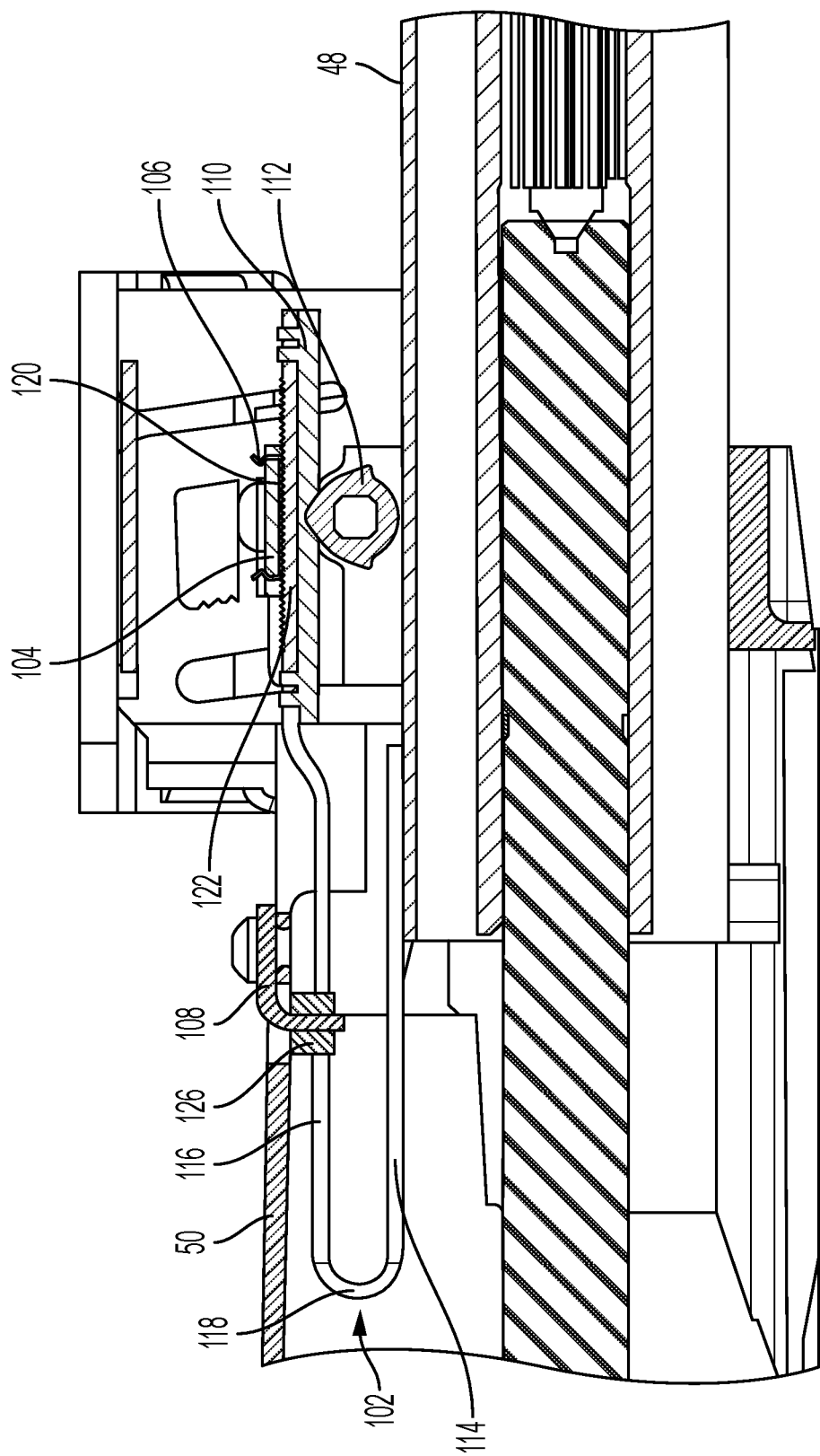
FIG. 3 is an elevation, partial cross-sectional view of a portion of the steering column assembly, illustrating the bi-directional lock mechanism and the energy absorption strap.
Figure 4:
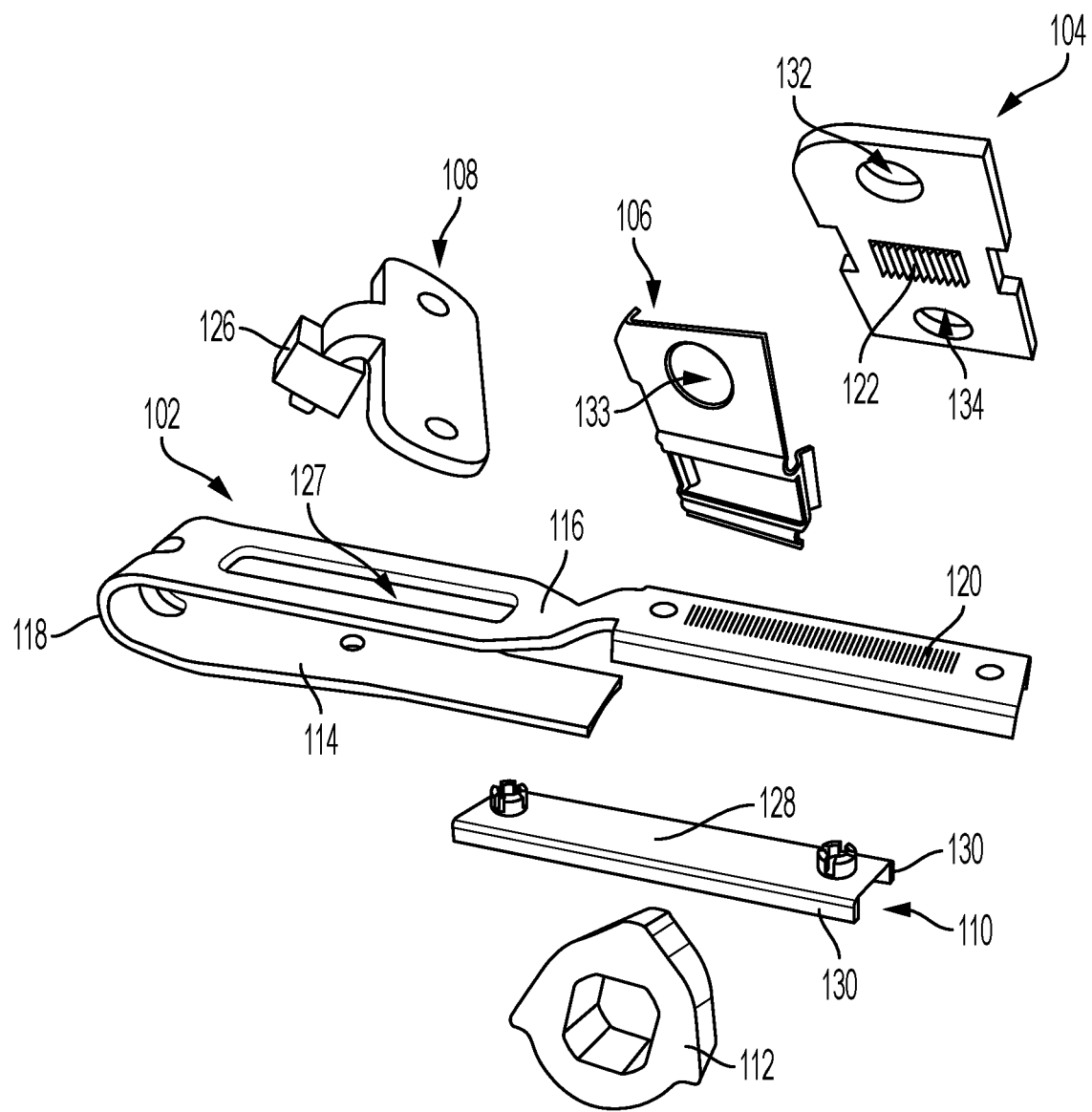
FIG. 4 is a disassembled view of the bi-directional lock mechanism.

Referring to FIGS. 2-4, the bi-directional lock mechanism 100 includes an energy absorption strap 102, a teeth bracket 104, a spring bracket 106, a telescope stop bracket 108, a telescope guide 110 and a cam 112.

The energy absorption strap 102 is operatively coupled to the upper jacket 48 with one or more fasteners, or welding. The energy absorption strap 102 includes a first leg 114, a second leg 116 and a curved transition portion 118 connecting the first leg 114 and the second leg 116. The first leg 114 is coupled to the upper jacket 48 and the second leg 116 includes a plurality of teeth 120 configured to be selectively moved into an out of engagement with a plurality of teeth 122 of the teeth bracket 104 to define the locked position of the bi-directional lock mechanism 100 (FIG. 5) and out of engagement with the plurality of teeth 122 to define the unlocked position (FIG. 6). In the unlocked position of the bi-directional lock mechanism 100, the energy absorption strap 102 is free to move axially in the telescope direction with the upper jacket 48 to which it is coupled, as described above.

The telescope stop bracket 108 is operatively coupled to the lower jacket 50 and includes a stop segment 126 extending radially inward into the lower jacket 50. The stop segment 126 may be integrally formed with the telescope stop bracket 108 or may be a separate component coupled thereto. In some embodiments, the stop segment 126 is formed of a different material than the rest of the telescope stop bracket 108, such as a resilient material to define a bumper suitable for contacting the energy absorption strap 102 at the predefined travel limit. In particular, a portion of the stop segment 126 is disposed within a slot 127 defined by the second leg 116 of the energy absorption strap 102. The ends of the slot 127 define the telescope travel limits.

The telescope guide 110 is coupled to an inner side of the second leg 116. The telescope guide 110 may be coupled to the second leg 116 in any suitable manner, such as with deformable tabs or mechanical fasteners. The telescope guide 110 reduces noise during telescope movement. The telescope guide 110 includes a main body 128 and a pair of radially inwardly extending legs 130 extending from the main body 128. The space between the radially inwardly extending legs 130 is suitable for accommodating a portion of the cam 112 therebetween and retains the cam 112 therein to laterally retain a portion of the cam 112 therebetween.

The teeth bracket 104 is disposed on the spring bracket 106, with both being coupled to the lower jacket 50 together. In particular, the teeth bracket 104 defines a pair of holes 132, 134, with one of the holes 132 aligned with a hole 133 defined by the spring bracket 106. Mechanical fasteners 137, 139 couple the teeth bracket 104 and the spring bracket 106 to the lower jacket 50 with the spring bracket 106 being located radially inward of the teeth bracket 104. The hole 134 of the teeth bracket 104 which is not aligned with the hole 133 of the spring bracket 106 is non-circular to define an elongated hole (e.g., slot) that allows lateral movement for releasing the deformation of the lower jacket 50 during locking and unlocking. When installed, the plurality of teeth 122 are aligned with an opening 134. This alignment makes the plurality of teeth 122 aligned with, and accessible to, the plurality of teeth 120 of the energy absorption strap 102.

Figure 5:
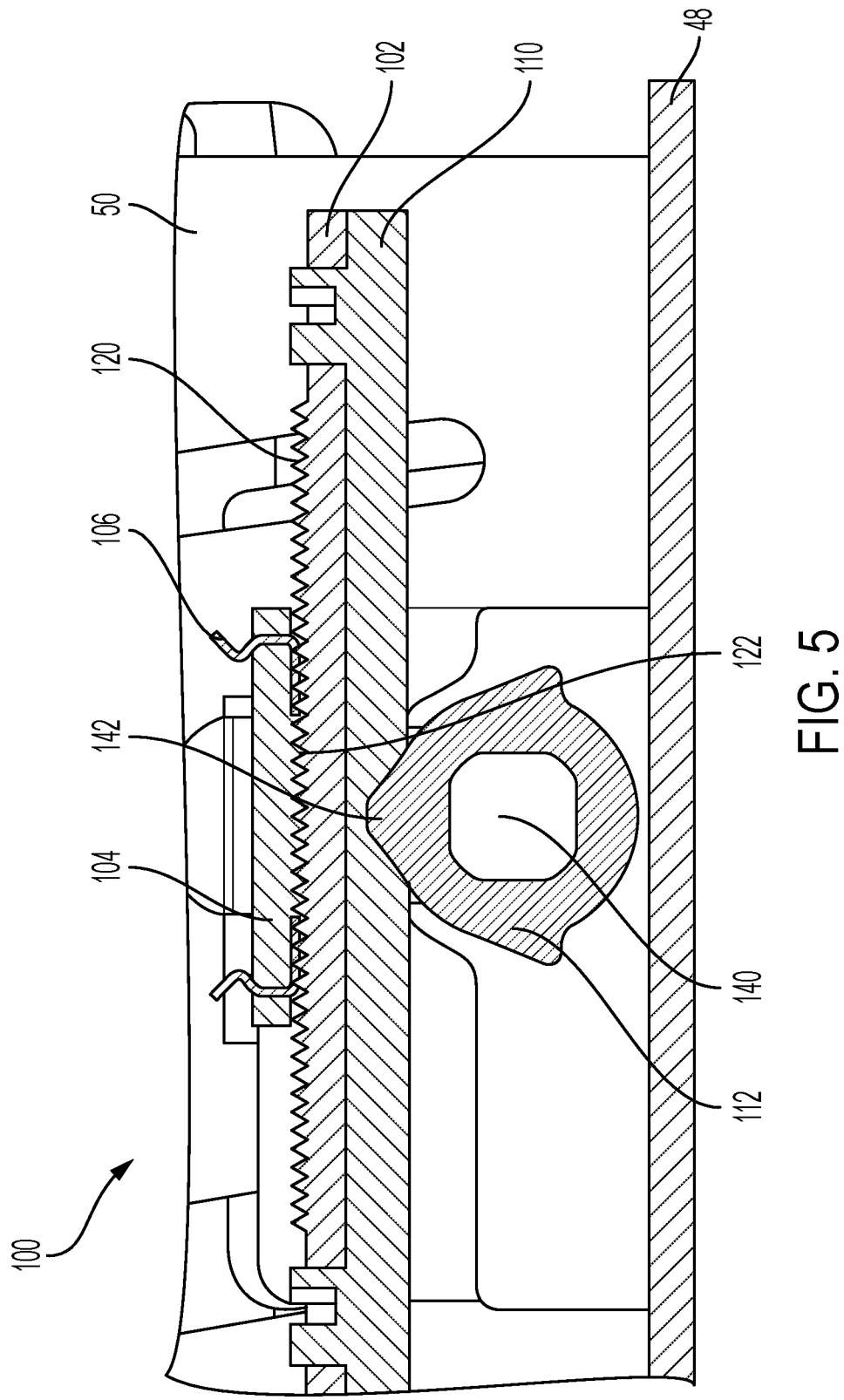
FIG. 5 is an elevation, partial cross-sectional view of the bi-directional lock mechanism in a locked position.
Figure 6:
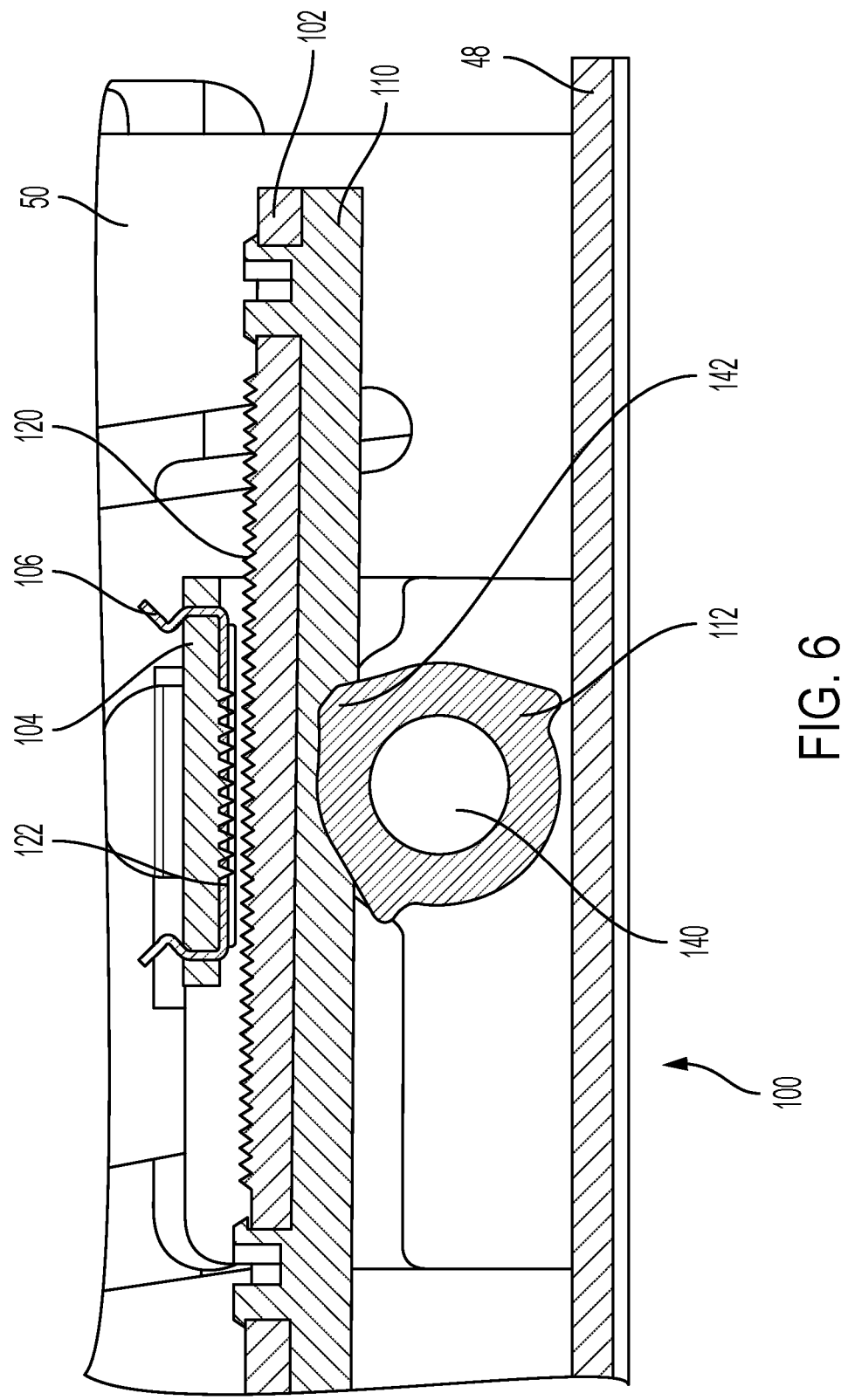
FIG. 6 is an elevation, partial cross-sectional view of the bi-directional lock mechanism in an unlocked position.

Referring now to FIGS. 5 and 6, the bi-directional lock mechanism 100 is shown in a locked position (FIG. 5) and an unlocked position (FIG. 6). In particular, in the locked position, the plurality of teeth 120 of the energy absorption strap 102 are meshingly engaged with the plurality of teeth 122 of the teeth bracket 104. Engagement of the teeth 120, 122 prevent movement of the energy absorption strap 102— and therefore the upper jacket 48—in both directions (i.e., fore and aft) parallel to the longitudinal axis of the steering column assembly 44 since the teeth bracket 104 is fixed to the stationary lower jacket 50.

The cam 112 is coupled to a bolt 140 (also shown in FIG. 8) extending laterally across the lower jacket 50 in a direction substantially perpendicular to the longitudinal axis of the steering column assembly 44. The bolt 140 is operatively coupled to the adjustable lever 52 such that the bolt 140 rotates with the lever 52. The connection between the cam 112 and the bolt 140 results in corresponding rotation of the cam 112 during rotation of the lever 52 and the bolt 140. The cam 112 includes a biasing portion 142 that is positioned to move the telescope guide 110 and the energy absorption strap 102 radially outward (up in views of FIGS. 5 and 6) in the locked position and radially inward (down in views of FIGS. 5 and 6) in the unlocked position. In operation, when the lever 52 is in the locked position, the cam 112 biases the telescope guide 110 and the energy absorption strap 102 radially outward to an extent sufficient to have the teeth 120 of the strap 102 engaged with the teeth 122 of the teeth bracket 104. As the lever 52 is rotated away from the locked position toward an unlocked position, the cam 112 is rotated to allow the telescope guide 110 and the energy absorption strap 102 to move radially inwardly to provide clearance between teeth 120 and teeth 122, thereby unlocking the steering column assembly 44.

Figure 9:
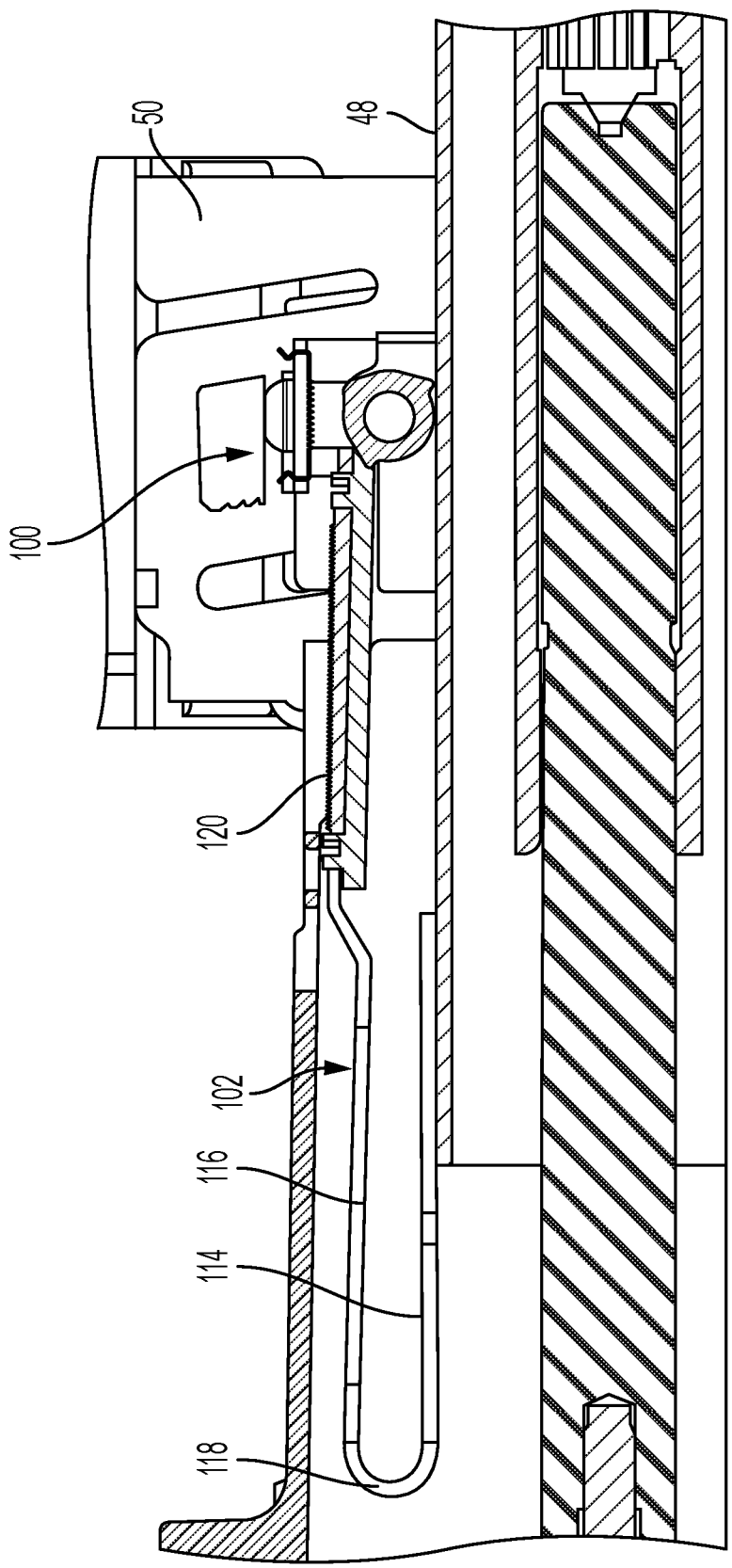
FIG. 9 is an elevational, cross-sectional view of the energy absorption strap prior to final assembly within the steering column assembly.

As shown in FIG. 9, the second leg 116 of the energy absorption strap 102 is slanted in a free state. In some embodiments, the second leg 116 is angled radially inwardly at about 1.5 degrees in the free state, but other angular orientations are contemplated. Therefore, the second leg 116 with the plurality of teeth 120 are predisposed to be out of contact with the teeth 122 of the teeth bracket 104. The cam 112 overcomes this predisposition during operation to move to the locked position of the bi-directional lock mechanism 100. The cam 112 includes a ramped portion which guides the energy absorption strap 102 over the cam 112 during initial assembly. Additionally, the telescope guide 110 may have a ramped portion which corresponds to the ramped portion of the cam 112 to further assist with the assembly process. As shown, when the lever 52, and therefore the cam 112, is in the unlocked position, the energy absorption strap 102 is able to be inserted over the cam 112 to a final assembled position which aligns the teeth 120 of the energy absorption strap 102 with the teeth 122 of the teeth bracket 104.

Figure 7:
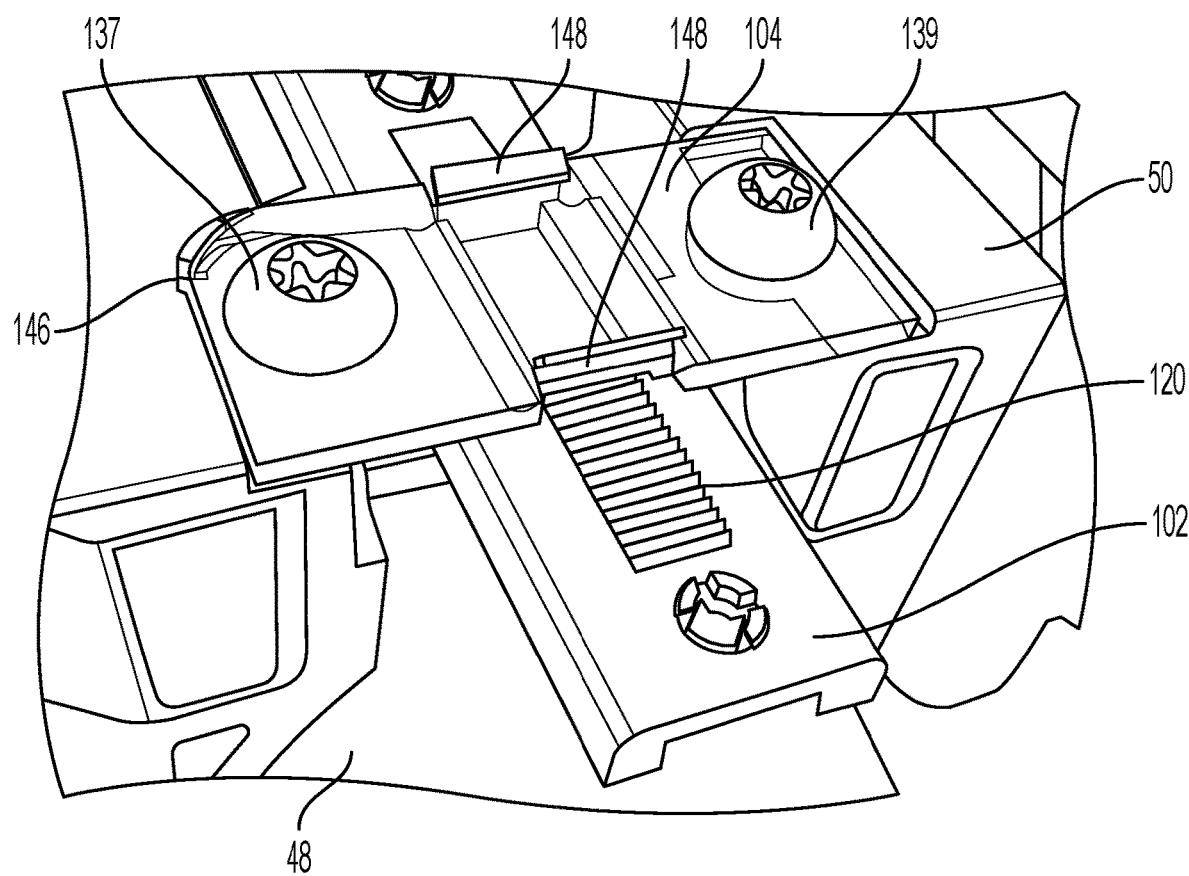
FIG. 7 is a perspective view of a portion of the bi-directional lock mechanism.

Referring now to FIG. 7, additional features of the spring bracket 106 are shown. In particular, the spring bracket 106 includes an error-proofing feature shaped to correspond to a curved corner 146 of the teeth bracket 104 which ensures proper directional installation of the teeth bracket 104. Additionally, the spring bracket 106 includes a pair of clips 148 that are spaced from each other and provide positive retention of the teeth bracket 104 when properly installed.

Figure 8:
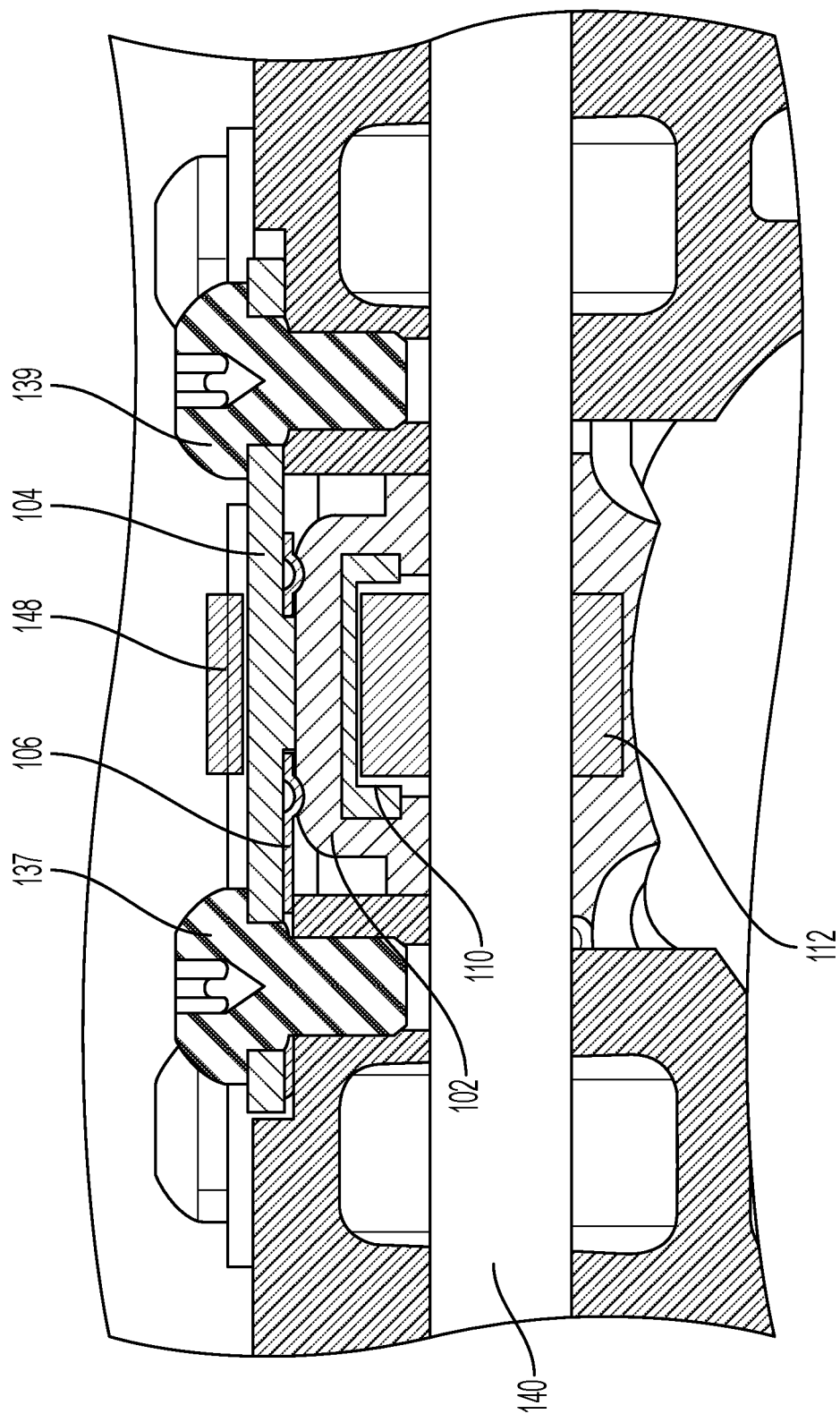
FIG. 8 is a cross-sectional, end view of the bi-directional lock mechanism.

Referring to FIG. 8, the connection of the mechanical fasteners 137, 139 to the teeth bracket 104, the spring bracket 106 and the lower jacket 50 is shown in greater detail. In particular, fastener 137 is shown to have a pre-tension seat on the teeth bracket 104 and the spring bracket 106 to fix the teeth bracket 104 and the spring bracket 106 on the side of fastener 137, while fastener 139 has a pre-tension seat on the lower jacket 50, which allows the teeth bracket 104 to be free on the side of fastener 139, thereby allowing lateral movement for releasing the deformation of the lower jacket 50 during locking and unlocking.

FIG. 8 also illustrates a pair of curved segments of the spring bracket 106. The curved segments protrude radially inwardly toward the energy absorption strap 102. The extent of protrusion of the curved segments is greater than the height of the teeth 122 of the teeth bracket 104. This relative dimensioning ensures that the teeth 120, 122 fully separate from each other in the unlocked position to prevent tooth-to-tooth contact during telescope motion. Therefore, the curved segments of the spring bracket 106 prevent undesirable noise during operation, even when the energy absorption strap 102 is deformed during radially outward motion.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpre-

What is claimed is:

1. An axially adjustable steering column comprising:
   an upper jacket;
   a lower jacket, wherein the upper jacket is axially adjustable relative to the lower jacket;
   an adjustment lever; and
   a bi-directional locking mechanism, wherein the adjustment lever selectively moves the bi-directional locking mechanism between a locked position and an unlocked position, wherein the locked position prevents axial adjustment of the upper jacket relative to the lower jacket in both axial directions, and the unlocked position allows adjustment of the upper jacket relative to the lower jacket, the bi-directional locking mechanism comprising:
      an energy absorption strap operatively coupled to the upper jacket, the energy absorption strap having a first plurality of teeth formed thereon;
      a teeth bracket operatively coupled to the lower jacket, the teeth bracket having a second plurality of teeth formed thereon;
      a cam operatively coupled to the adjustment lever, wherein rotation of the adjustment lever causes rotation of the cam, wherein rotation of the cam selectively moves the first plurality of teeth into and out of engagement with the second plurality of teeth to define the locked position and the unlocked position, respectively; and
      a spring bracket, wherein the teeth bracket is seated on a radially outward side of the spring bracket.

2. The axially adjustable steering column of claim 1, wherein the spring bracket includes an opening aligned with the second plurality of teeth of the teeth bracket.

3. The axially adjustable steering column of claim 1, wherein the spring bracket includes a pair of clips spaced from each other and positioned to engage sides of the teeth bracket to provide positive retention of the teeth bracket when installed.

4. The axially adjustable steering column of claim 1, wherein the spring bracket includes an error proofing position feature shaped to correspond to a curved corner of the teeth bracket.

5. An axially adjustable steering column comprising:
   an upper jacket;
   a lower jacket, wherein the upper jacket is axially adjustable relative to the lower jacket;
   an adjustment lever; and
   a bi-directional locking mechanism, wherein the adjustment lever selectively moves the bi-directional locking mechanism between a locked position and an unlocked position, wherein the locked position prevents axial adjustment of the upper jacket relative to the lower jacket in both axial directions, and the unlocked position allows adjustment of the upper jacket relative to the lower jacket, the bi-directional locking mechanism comprising:
      an energy absorption strap operatively coupled to the upper jacket, the energy absorption strap having a first plurality of teeth formed thereon, wherein the energy absorption strap comprises a first leg, a second leg, and a curved transition portion connecting the first leg and the second leg;
      a teeth bracket operatively coupled to the lower jacket, the teeth bracket having a second plurality of teeth formed thereon;
      a cam operatively coupled to the adjustment lever, wherein rotation of the adjustment lever causes rotation of the cam, wherein rotation of the cam selectively moves the first plurality of teeth into and out of engagement with the second plurality of teeth to define the locked position and the unlocked position, respectively; and
      a telescope guide operatively coupled to the energy absorption strap, the telescope guide including a main body and a pair of radially inwardly extending legs extending from the main body to laterally retain a portion of the cam.

6. The axially adjustable steering column of claim 5, wherein the first plurality of teeth are defined on the second leg of the energy absorption strap.

7. The axially adjustable steering column of claim 5, wherein the telescope guide is operatively coupled to the second leg of the energy absorption strap.

8. The axially adjustable steering column of claim 5, wherein the bi-directional locking mechanism further comprises a telescope stop bracket operatively coupled to the lower jacket, the telescope stop bracket having a stop segment extending radially inward into a slot defined by the energy absorption strap to define telescope travel limits for the upper jacket relative to the lower jacket.

9. The axially adjustable steering column of claim 8, wherein the slot defined by the energy absorption strap is defined by the second leg of the energy absorption strap.

10. The axially adjustable steering column of claim 8, wherein the telescope stop segment is formed of a different material than the rest of the telescope stop bracket.

11. The axially adjustable steering column of claim 10, wherein the telescope stop segment is formed of a resilient material.

12. A bi-directional locking mechanism for a telescoping steering column, the bi-directional locking mechanism comprising:
   an energy absorption strap having a first leg, a second leg, and a curved transition portion connecting the first leg and the second leg, wherein the second leg includes a first plurality of teeth formed thereon;
   a teeth bracket having a second plurality of teeth formed thereon;
   a cam, wherein rotation of the cam selectively moves the first plurality of teeth into and out of engagement with the second plurality of teeth to define a locked position and an unlocked position, respectively;
   a telescope guide operatively coupled to the second leg of the energy absorption strap, wherein the telescope guide includes a main body and a pair of radially inwardly extending legs extending from the main body to laterally retain a portion of the cam;
   a telescope stop bracket having a stop segment extending radially inward into a slot defined by the second leg of the energy absorption strap to define telescope travel limits for the telescoping steering column; and
   a spring bracket, wherein the teeth bracket is seated on a radially outward side of the spring bracket, wherein the spring bracket includes an opening aligned with the second plurality of teeth of the teeth bracket.

13. The bi-directional locking mechanism of claim 12, wherein the spring bracket includes a pair of clips spaced from each other and positioned to engage sides of the teeth bracket to provide positive retention of the teeth bracket when installed.

14. The bi-directional locking mechanism of claim 12, wherein the spring bracket includes an error proofing position feature shaped to correspond to a curved corner of the teeth bracket.

* * * * *